United States Patent [19]
Boyden

[11] Patent Number: 5,120,070
[45] Date of Patent: Jun. 9, 1992

[54] ADJUSTABLE WINDMOBILE

[76] Inventor: Willis G. Boyden, Box 83533, Los Angeles, Calif. 90083

[21] Appl. No.: 669,471

[22] Filed: Mar. 14, 1991

[51] Int. Cl.$^5$ .............................................. B62B 15/00
[52] U.S. Cl. ...................................... 280/1; 114/39.1; 114/93; 180/2.2; 280/93; 280/810
[58] Field of Search ...................... 180/2.2, 7.1; 280/1, 280/810, 93, 95.1; 114/39.1, 43, 90, 91, 93, 364

[56] References Cited

U.S. PATENT DOCUMENTS

| | | | |
|---|---|---|---|
| 299,317 | 5/1884 | Aspinwall | 180/2.2 |
| 4,005,669 | 2/1977 | Klemm | 114/39.1 |
| 4,408,772 | 10/1983 | Hollwarth | 114/43 |

Primary Examiner—David M. Mitchell

[57] ABSTRACT

The adjustable windmobile allows the mobilist to maintain a stable center of gravity by manually adjusting both the seat and mast to their respective opposite sides when the direction of motion of the windmobile is reversed. Both the seat and mast base are encased in crosspieces, that are part of the frame, that allow the seat and mast to be slid to the opposite sides. There are four mast halyards, a fore halyard, a stern halyard, and two midships halyards. Under sail only three halyards are taut while the fourth, a midships halyard hangs loose. When readjusting the mast to the other side, the halyards do not have to be readjusted.

3 Claims, 5 Drawing Sheets

ADJUSTABLE WINDMOBILE

BACKGROUND OF THE INVENTION

In many places, the Wind blows quite steadily from a predictable direction during a certain part of the day. For instance, in Southern California near the ocean the wind will blow in from the west to fill in the vacuum left by the land-heated thermally rising air ashore.

Once the sail is set a mobilist may go along the shore for many miles, in a generally north or south direction. He may also turn the windmobile around and go in the opposite direction, if he has a device that will allow him to this, while still adhering to the physical laws that govern a windmobile.

SUMMARY OF THE INVENTION

The adjustable windmoble, described herein, allows him to elegantly and simply reset the windmobile, in a matter of seconds, for travel in the opposite direction.

There are two sails on the adjustable windmobile, a triangular mainsail and a triangular jib sail, much like a normal sailboat. The jib is related by a single sheet tied to the bottom of the mast and will assume a leeward position. The mainsail is secured to the mast along one edge, and secured to the boom along the lower edge. The mainsail also assumes a leeward position, and the boom is secured by an adjustable sheet.

The mobilist sits in an adjustable seat, from which position he can control the windmobile. Steering is accomplished by a tiller-pulley-guy wire arrangement connected to the two front wheels. The position of the two back wheels is fixed.

When the mobilist wants to reverse direction he simply stops the windmobile, turns it around, slides the mast and chair to the opposite side, sits in the seat, and away he goes.

The body of the adjustable windmobile is a rather complicated, but functional, essentially square frame. The mast is secured by four halyards. Three of the halyards are tight while the fourth halyard, a midship halyard, hangs loose, depending on the direction he is traveling. Because of this unique construction, there is nothing in the immediate vicinity of the mobilist, such as halyards, or sheets, to impede his actions.

Stability is provided, in the adjustable windmobile, by the positioning of the seat in the furthest windward position, and the positioning of the mast in a furthest leeward position. The downward weight vector of the mobilist, thus opposes the lateral wind vector against the tightened mast midships halyard. The four wheel arrangement also adds stability by maintaining the center of gravity within the wheel base.

Thus many of the elegant features of the four-wheel adjustable, windmobile could no be attained with a three wheel approach.

With the adjustable windmobile at his disposal, the mobilist may enjoy many carefree hours, while using no fossil fuels, and adding nothing to the environment beyond a happy song.

DESCRIPTION OF THE PREFERRED EMBODIMENT

Figure 1:
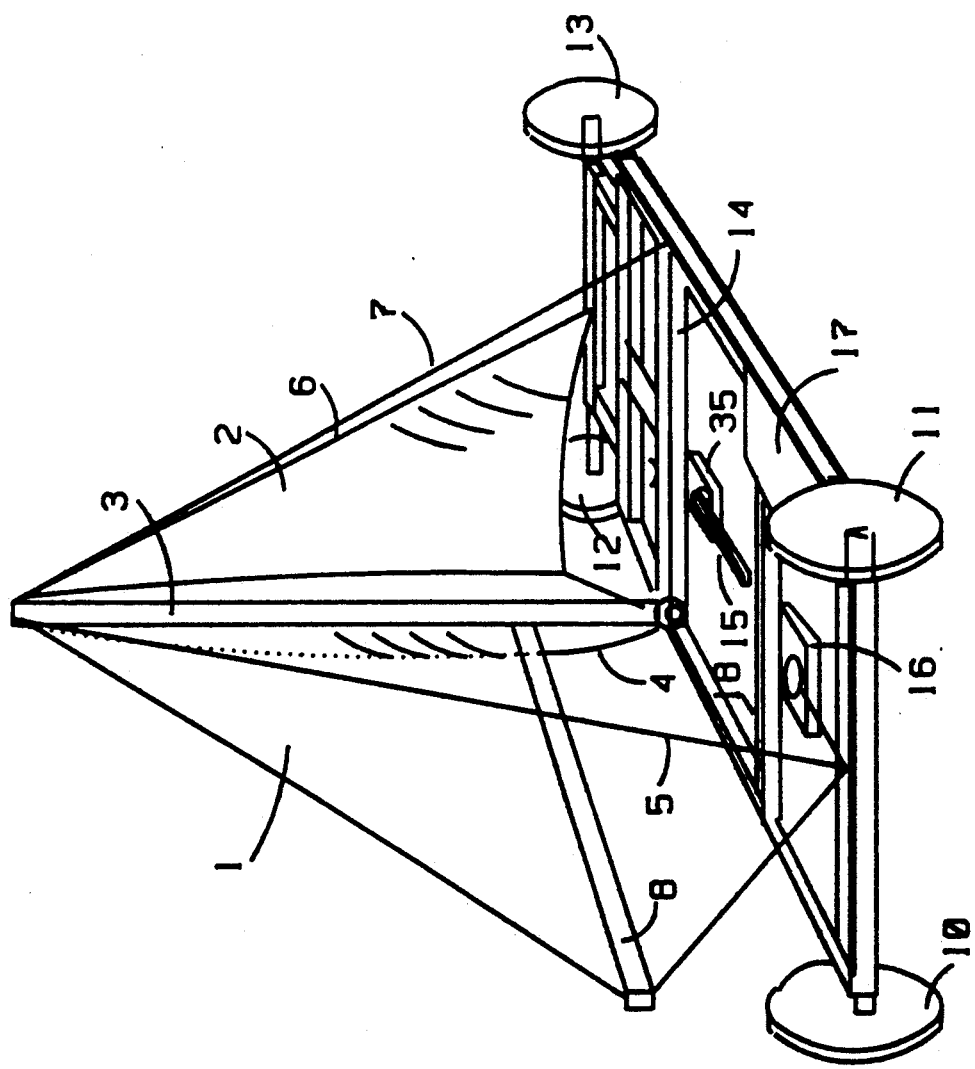
FIG. 1 is a full pictorial view of the preferred embodiment.

In FIG. 1 the adjustable windmobile is shown rigged for motion in the direction of the arrow. The front halyard 6, rear halyard 5 and starboard halyard 7 are taught, while the port halyard 4 is hanging loose. The front wheels 12, 13 are adjusted by moving the tiller 15. The setting of the mainsail 1 and boom 8 is controlled by the mainsail adjusting wheel 39, bearing on the mainsail sheet 9. The seat 17 is shown the position used when traveling in the direction of the arrow. When reversing direction, the seat 17 is moved along the seat tubular crosspiece 18 to the other side; in a likewise manner, the mast 3 is moved along the mast crosspiece 1 the position used when traveling in the direction of the arrow. When reversing direction, the seat 17 is moved along the seat tubular crosspiece 18 to the other side; in a likewise manner, the mast 3 is moved along the mast crosspiece 14 to the other side.

Figure 2:
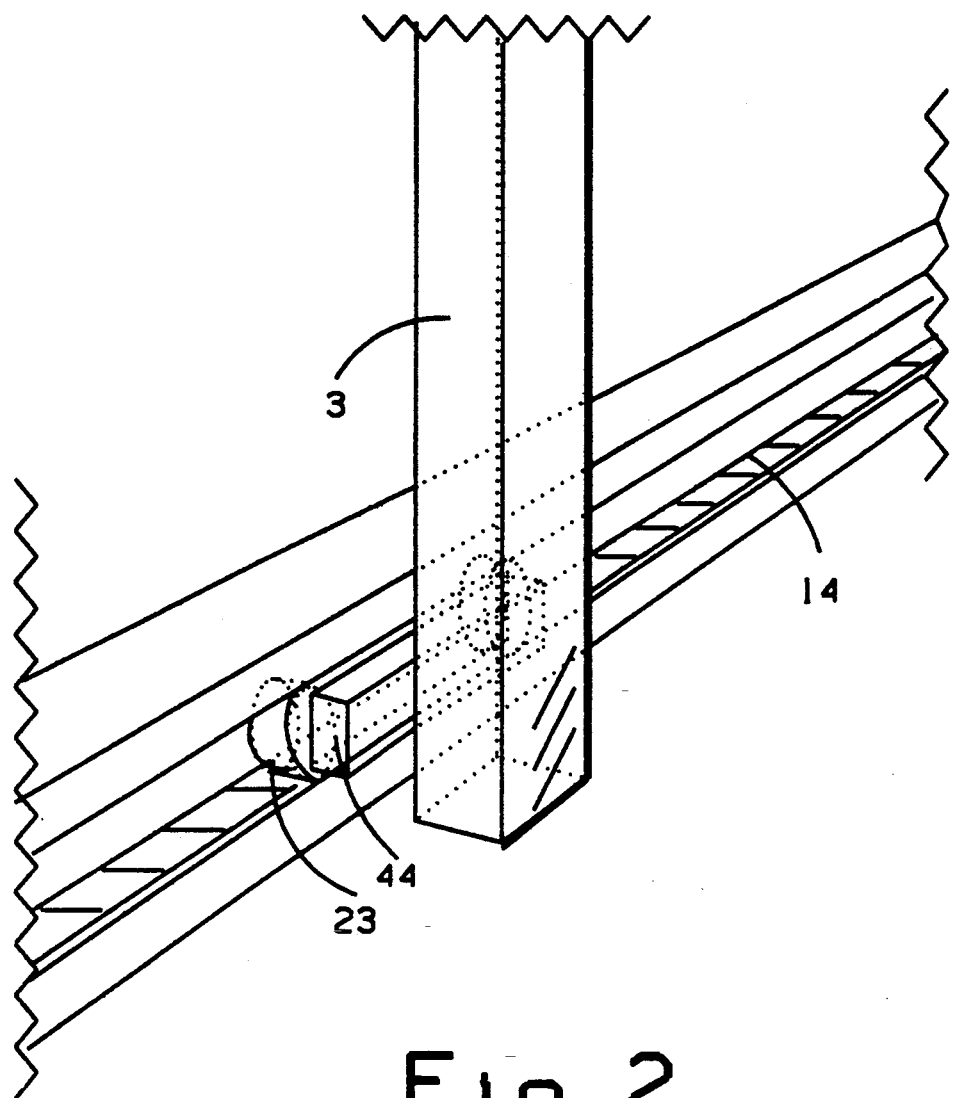
FIG. 2 is a partial view of the bottom of the mast in the tubular central crosspiece.

FIG. 2 is a cutaway drawing showing the configuration of the mast 3. The mast 3 is attached to the mast rollers 23; the mast rollers 23 slides freely in the mast crosspiece 14.

Figure 3:
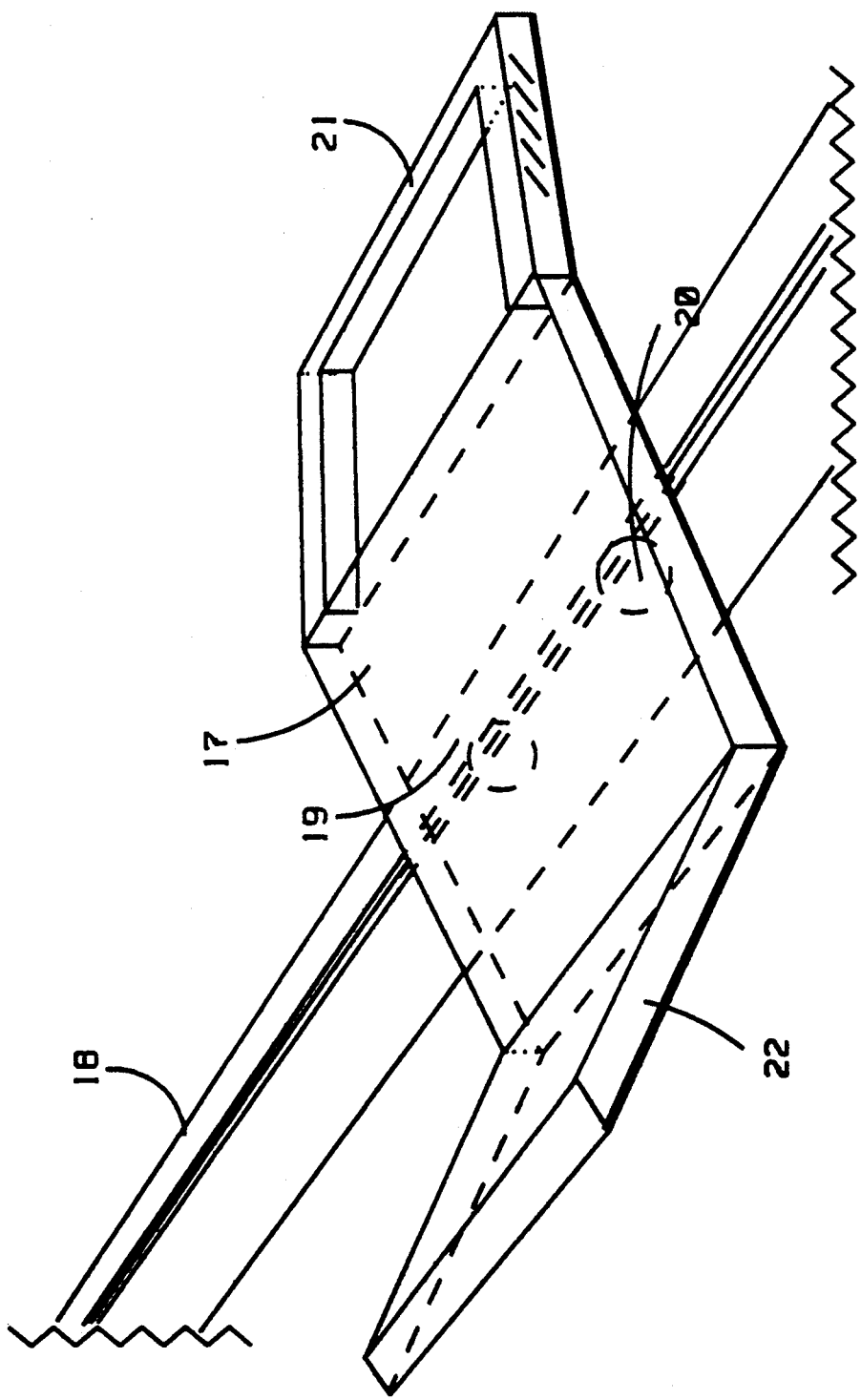
FIG. 3 is a partial view showing the chair attached to the tubular chair crosspiece.

FIG. 3 is a cutaway view of the seat 17, 21, 22. The seat bottom 17, the seat leg rest 21 and the seat attached to the left seat ball 19 and right seat ball 20. The seat balls 19, 20 are free to slide in the seat tubular crosspiece 18

Figure 4:
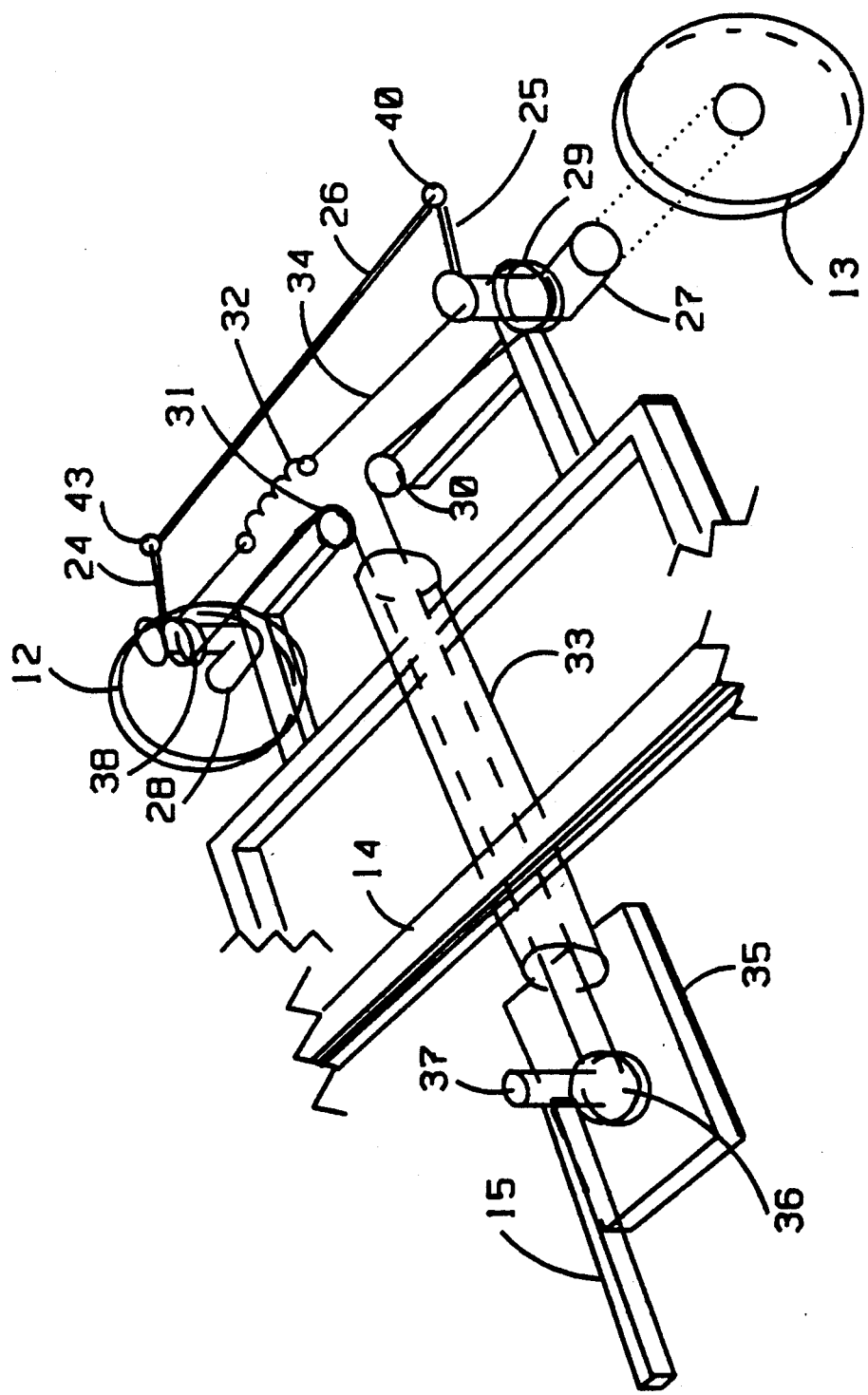
FIG. 4 shows the tiller-pulley arrangement for controlling the front wheels.

FIG. 4 is a cutout view of an embodiment of the steering mechanism. As the tiller 15 is moved, the front wheels 12, 13 will move. The guy wire 34 is threaded around the tiller pulley 36, through the steering guy wire guide 33, around the front right pulley 30 and front left pulley 31, and around. The left front axle 28 and right front axle 27. The steering tension spring 32 keeps the steering guy wire 34 taught. The front wheels 12, 13 are kept parallel by the left steering arm 24, center steering arm 26, and right steering arm 25. The steering arms 24, 25, 26 swivel in the left steering ball socket 43 and right steering ball socket 40. The left axle 28 and right axle 27 swivel in the left axle socket 38 and right axle socket 29, respectively. The tiller 15 is attached to the tiller axle 37; the tiller axle 37 is attached to the tiller pulley 36 and swivels in the steering plate 35.

Figure 5:
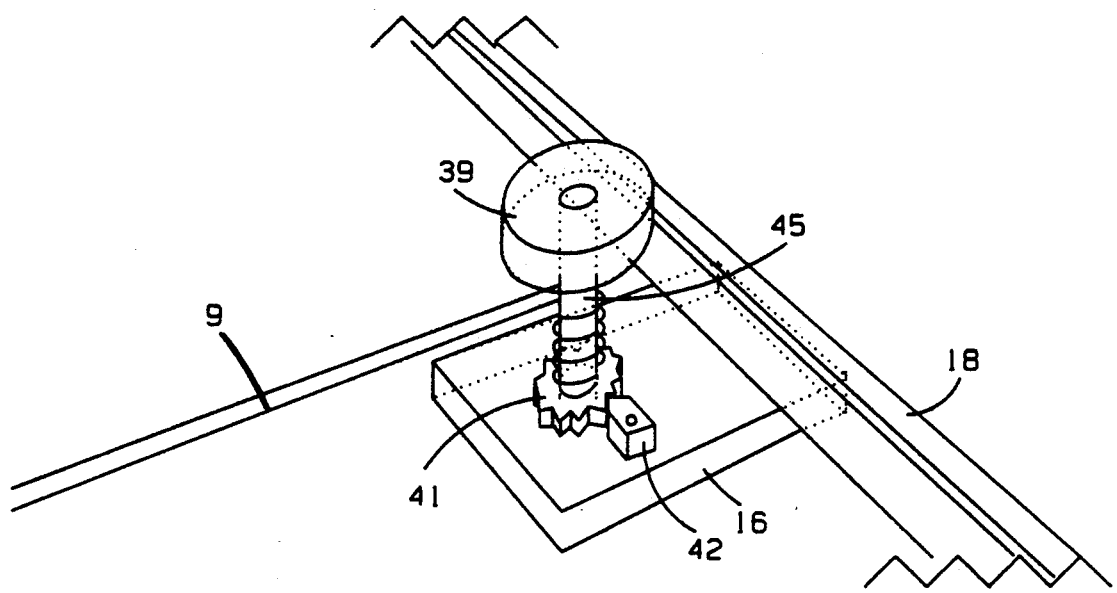
FIG. 5 is a partial drawing showing the arrangement for adjusting the boom.

FIG. 5 shows the cutaway view of an embodiment of the boom adjustment mechanism. The boom adjustment mechanism. The boom sheet 9 is threaded around the tiller axle 37. The tiller axle 37 is attached to the boom adjuster wheel 39. The tiller axle 37 is free to swirl in the boom adjuster wheel plate 16 The tiller axle 37 is also attached to the boom wheel ratchet gear 41. The boom wheel ratchet 42 is a standard one-direction releasable ratchet that keeps the boom adjuster wheel 39 from turning. The wheel 39 from turning. The boom adjuster wheel plate 16 is attached to the seat tubular crosspiece 18.

I claim:

1. An adjustable windmobile, for relocating the center of gravity to a stable position when reversing direction of the windmobile by sliding the mast and the seat to their opposite respective sides comprising:

a square frame, said square frame comprising a standard wheel and axle at each of the four corners of said square frame, the two rear wheels of said square frame being mounted on the same rear axle, said rear axle being parallel to the rear edge of said square frame, said rear wheels being parallel to each other, said square frame being approximately oblong in shape with the longer axis of said oblong being directed along the line of motion of said adjustable windmobile, said rear wheels being parallel to the longer axis of said oblong, said front wheels being maintained parallel to each other, means of steering said two front wheels a mast crosspiece, said mast crosspiece being attached to said frame, said mast crosspiece being parallel to said frame, said mast crosspiece being parallel to the shorter axes of said frame, said mast crosspiece being hollow and of a square C shape, said mast crosspiece extending from near or beyond one long edge of said frame to the opposite edge of said frame, said mast crosspiece being located approximately one third of the distance from the front of said frame, a mast, said mast being of the standard variety mast runners, said mast runners being attached to the bottom of said mast, said mast runners being of the wheeled, ballbearing type, said mast runners being of a diameter slightly less than the longest inner dimension of said square C portion of said mast crosspiece, said mast runners being inserted inside and running along said C of said mast crosspiece, the axles of said mast runners being parallel to said frame, the axles of said mast runners being attached to a mast bar, said mast bar being a square piece of approximately four inches in length, said mast bar being attached to the base of said mast, said mast bar being perpendicular to said mast, two midships halyards, said midship halyards extending from the top of said mast to each end of said mast crosspiece, a fore halyard, said fore halyard extending from the top of said mast to the center of the front edge of said frame, a stern halyard, said stern halyard extending from the top of said mast to the center of the rear edge of said frame, a seat crosspiece, said seat crosspiece being attached to said frame, said seat crosspiece being parallel to said frame, said seat crosspiece being parallel to the shorter axes of said frame, said seat cross piece extending from near or beyond one long edge of said frame to near or beyond the opposite edge of said frame, said seat crosspiece being of a tubular hollow C shape, the open end of said C shape projecting upwards, said seat crosspiece being located approximately two thirds of the distance from the front edge to the rear edge of said frame, a seat, said seat comprising:

a seat bottom, said seat bottom being essentially a flat square piece, said seat bottom attached to two seat runners, said seat runners being spherical in shape, said seat runners having a diameter slightly less than the inside diameter of said C shape tubular seat crosspiece, said seat runners being attached to the underside of the center horizontal axis of said seat bottom, said center horizontal axis being parallel to the front edge of said seat bottom, said seat runners being inside and sliding along said tubular crosspiece, a seat back, said seat back being similar in shape to said seat bottom, one edge of said seat back being attached to one edge of said seat bottom, the plane of said seat back being approximately sixty degrees to the plane of said seat back being approximately sixty degrees to the plane of said seat bottom, said rear edge of the said seat bottom being parallel to the rear edge of said square frame, a seat leg rest, said seat leg rest being of a tubular pipe construction, said pipe having a diameter of approximately one inch, said seat leg rest forming a square C in shape, the two ends of said C being connected to the two front corners of said seat bottom, the plane of said C being projected downwards at an approximate angle of thirty degrees to the plane of said seat bottom, a jib sail, said jib sail being triangular in shape, the front edge of said jib sail being attached to said fore halyard, said jib sail being an inverted triangle, a jib sheet, said jib sheet being attached from the bottom of said mast to the rear corner of said jib sail, a boom, said boom being of a diameter approximately equal to the diameter of said mast, said boom being of a length somewhat less than the length of said mast, said boom being attached to said mast approximately one quarter of the distance from the bottom to the top of said mast, a mainsail, said mainsail being triangular in shape, said mainsail being an inverted triangle, the front edge of said triangle being attached to said mast, the bottom edge of said triangle being attached to said boom, means for adjusting said boom.

2. The adjustable windmobile of claim 1 wherein means for steering said two front wheels comprises:

two front axles, said front axles being of solid tubular construction, said two front axles being of an L shape, the horizontal portion of said L pieces serving as axles for said two front wheels, a portion of said horizontal portion being inserted into said two front wheels, the horizontal portion of said L pieces being parallel to the plane of said square frame, the vertical portion pieces being inserted into two axle sockets, said L pieces being perpendicular to the plane of said square frame, said axle sockets being attached to the two front corners of said square frame, the upper portion of the vertical portion of said front axles extending beyond said axle sockets, two axle pulleys, said axle pulleys having an inside diameter approximately equal to the outside diameter of said front axles, said axle pulley being attached to the said front axles, said axle pulleys being inserted over said front axles, a left and right steering rod, said steering rods being inserted into the upper portion of the vertical portion of said front axles, said left and right steering rods being approximately parallel to each other when the planes of said front wheels are parallel to each other, said left and right steering rods being parallel to the plane of said square frame, said left and right steering rods being approximately six inches long, a center steering rod, said center steering rod extending between the open ends of said left and right steering rods, a left and right steering rod ball socket, said ball sockets inserted between said left and right steering rods and said center steering rod, a steering guy wire guide, said steering guy wire guide being hallow tubular in shape, said steering guy wire guide being attached to the front center part of said square frame and the bottom center of said mast crosspiece, said steering guy wire guide running along the central axis of the longer portion of said square frame, a steering plate, said steering plate being flat and square in shape, said steering plate being attached to the rear bottom side of said steering guy wire guide, said steering plate being parallel to said square frame, said steering plate extending beyond the end of said steering guy wire guide for approximately six inches, a tiller axle, said tiller axle being of a solid tubular construction, said tiller axle inserted into and swiveling in said steering plate, said tiller axle being perpendicular to the plane of said steering plate, a tiller pulley, said tiller pulley being attached to and inserted over said tiller axle, a tiller, said tiller being of a long rod construction, said tiller being inserted into the top portion of said tiller axle, said tiller being parallel to said steering plate, the main part of said tiller axle, a front left pulley and a front right pulley, said front left and right pulley being attached to said square frame along a line connecting said left front axle and said right front axle, said front left and front right pulley being parallel to said square frame, said front left and front right pulleys being positioned directly in front of said steering guy wire guide, a steering guy wire, said steering guy wire being threaded around said tiller pulley, through said guy wire guide, around said front left and front right pulleys, and around said left and right axle pulleys, a steering tension spring, said steering tension spring being inserted between the two ends of said steering guy wire, and in the front center portion of said steering guy wire.

3. The adjustable windmobile of claim 2 wherein means for adjusting said boom comprises:

a boom adjuster wheel plate, said boom adjuster wheel plate being a flat plate, said boom adjuster wheel plate being attached to the bottom center of said seat crosspiece, said boom adjuster wheel plate being parallel to said square frame, said boom adjuster wheel plate being approximately six inches square frame, said boom adjuster wheel plate being approximately six inches square, said boom adjuster wheel plate extending back from said seat crosspiece, the front edge of said boom adjuster wheel plate being parallel to said seat crosspiece, a boom adjuster axle, said boom adjuster axle being inserted into the center of and swiveling in said boom adjuster wheel plate, a boom adjuster ratchet gear, said adjuster ratchet gear being inserted over and attached to the lower portion of said boom adjuster axle.

a boom adjuster ratchet, said boom adjuster ratchet being inserted into said boom adjuster wheel plate, said boom adjuster ratchet meshing with said boom adjuster ratchet gear, a boom adjuster wheel, said boom adjuster wheel being inserted over and attached to the top portion of said boom adjuster ratchet gear being parallel to said boom adjuster wheel plate, a boom sheet pulley, said boom sheet pulley being attached to the center of the rear edge of said square frame, a boom sheet, said boom sheet attached to the rear end of said boom, said boom sheet threaded through said boom sheet pulley and around said boom adjuster axle.

* * * * *